US009296431B1

(12) United States Patent
Aghssa et al.

(10) Patent No.: US 9,296,431 B1
(45) Date of Patent: Mar. 29, 2016

(54) VEHICLE UPPER BODY STRUCTURAL BRACE

(71) Applicant: Ford Global Technologies, LLC, Dearborn, MI (US)

(72) Inventors: Peyman Aghssa, Ann Arbor, MI (US); Michael Kryzaniwskyj, Warren, MI (US); Djamal Eddine Midoun, Ann Arbor, MI (US); Jamil M. Alwan, Ann Arbor, MI (US); Abdelmonaam Sassi, Windsor (CA); Kumar Mahadevan, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/575,033

(22) Filed: Dec. 18, 2014

(51) Int. Cl.
*B62D 25/04* (2006.01)
*B62D 27/02* (2006.01)
*B62D 25/20* (2006.01)

(52) U.S. Cl.
CPC .......... *B62D 27/023* (2013.01); *B62D 25/2027* (2013.01)

(58) Field of Classification Search
CPC .......... B41J 2/45; B41J 2/473; B62D 21/152; B62D 25/04; B62D 25/2027; B62D 33/023; B62D 33/0273; B62D 21/15; B62D 21/155; B62D 25/087; B60G 9/00; B60K 15/063; B60K 2015/0638
USPC ......... 296/187.11, 193.07, 182.1, 187.12, 30, 296/203.03; 280/794, 784, 834
See application file for complete search history.

(56) References Cited

U.S. PATENT DOCUMENTS

| 4,090,721 | A | | 5/1978 | Wedin et al. |
| 4,775,181 | A | * | 10/1988 | Shoda ....................... 296/203.04 |
| 5,022,704 | A | * | 6/1991 | Mizuno et al. ........... 296/203.03 |
| 5,941,597 | A | * | 8/1999 | Horiuchi et al. ......... 296/203.01 |
| 6,053,566 | A | | 4/2000 | Aghssa et al. |
| 6,254,174 | B1 | * | 7/2001 | Wee .......................... 296/203.04 |
| 6,648,404 | B2 | * | 11/2003 | Yakata et al. ................. 296/209 |
| 6,830,287 | B1 | | 12/2004 | Aghssa et al. |
| 7,140,674 | B2 | * | 11/2006 | Miyoshi et al. .......... 296/203.03 |
| 8,205,925 | B2 | * | 6/2012 | Hattori ............................. 296/30 |
| 8,534,748 | B1 | | 9/2013 | Aghssa et al. |
| 2008/0007093 | A1 | * | 1/2008 | Andou et al. ............. 296/193.08 |
| 2008/0258498 | A1 | | 10/2008 | Philip et al. |
| 2010/0270828 | A1 | | 10/2010 | Baccouche et al. |
| 2011/0309657 | A1 | * | 12/2011 | Hutter et al. ............. 296/193.06 |

FOREIGN PATENT DOCUMENTS

DE 102009039973 3/2011
DE 102009042984 3/2011
(Continued)

*Primary Examiner* — Glenn Dayoan
*Assistant Examiner* — Sunsurraye Westbrook
(74) *Attorney, Agent, or Firm* — Jason C. Rogers; Bejin Bieneman PLC

(57) ABSTRACT

A vehicle upper body structural brace apparatus includes a first member having a first end in a rear region of a vehicle and second and third members each coupled to a second end of the first member. The second and third members are configured to couple lower and upper unibody vehicle structural components, respectively. The first, second and third members transfer impact forces at the first end of the first member from the first end, around first and second vehicle interior regions, and to the lower and upper unibody vehicle structural components.

20 Claims, 4 Drawing Sheets

(56) References Cited

FOREIGN PATENT DOCUMENTS

| | | |
|---|---|---|
| DE | 102009042995 | 3/2011 |
| JP | S60131377 | 7/1985 |
| JP | S61282172 | 12/1986 |
| JP | 2006103435 | 4/2006 |
| JP | 2007118736 | 5/2007 |

* cited by examiner

VEHICLE UPPER BODY STRUCTURAL BRACE

BACKGROUND

It is desirable to manage forces applied to the vehicle, e.g. in a rear impact, to avoid certain vehicle components, such as those associated with the fuel system and proximate to and within the vehicle occupant cabin. However, packaging constraints and other design considerations, such as weight efficient architectures to improve fuel efficiency, limit the design space and use of conventional reinforcements. Accordingly, improving energy management within current design space and performance parameters is desirable, but currently challenging.

DRAWINGS

DETAILED DESCRIPTION

Figure 1:
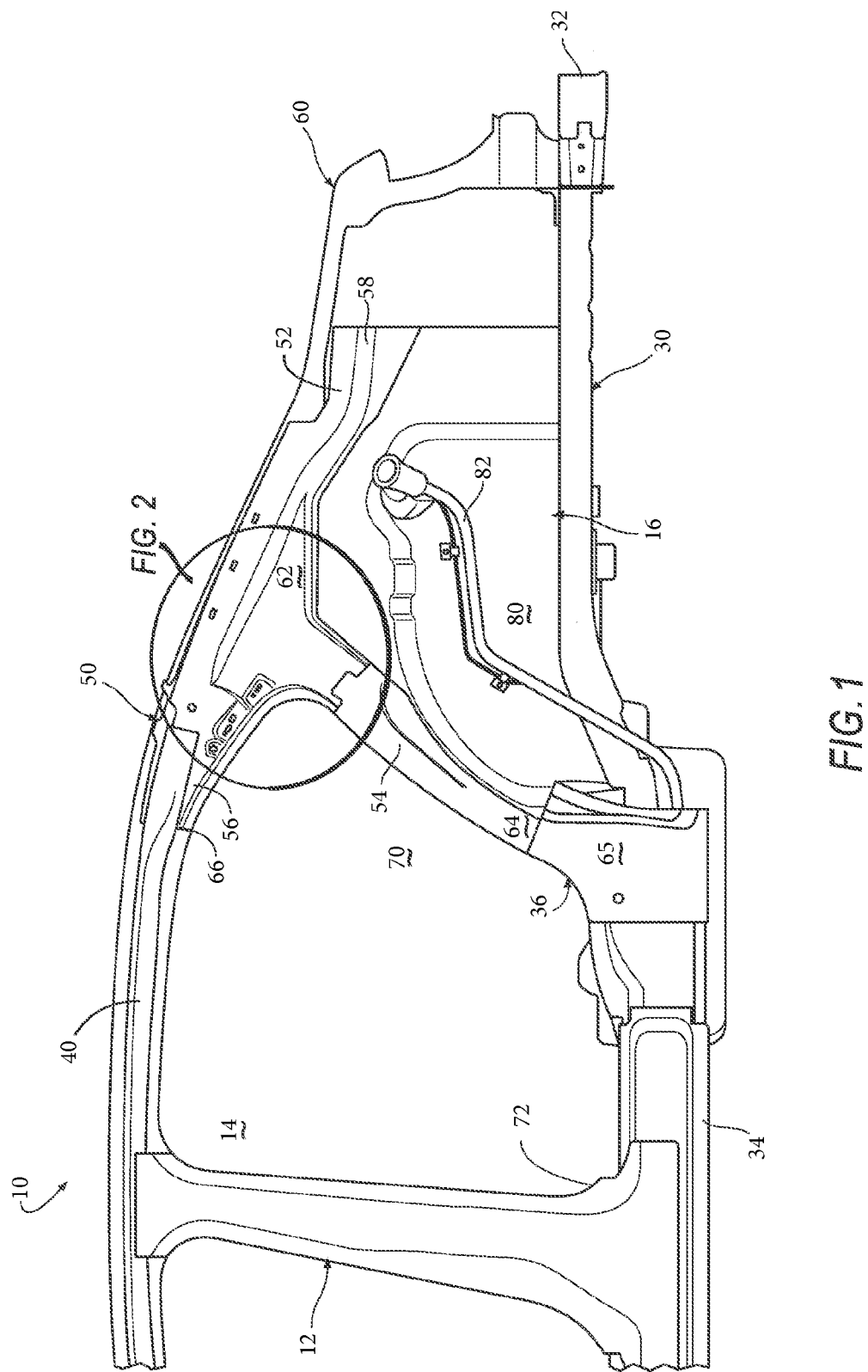
FIG. 1 is a side view of a portion of an exemplary unibody vehicle structure

FIG. 1 is side view of a portion of an exemplary unibody structure for a vehicle 10, such as, for example, a passenger car. It should be understood that a vehicle upper body structural brace according to the principles of the present disclosure, may be incorporated into a variety of vehicles. The exemplary vehicle 10 includes a unibody structural assembly 12, a rear passenger cabin 14, and a rear quarter panel region 16. The unibody structural assembly 12 includes an underbody subassembly 30, with a rear bumper 32, a bottom frame component 34 and a wheel housing 36. The unibody structural assembly 12 further includes a roof rail 40. The bottom frame component 34 and the roof rail 40 extend, respectively, below and above the rear passenger cabin 14.

Figure 2:
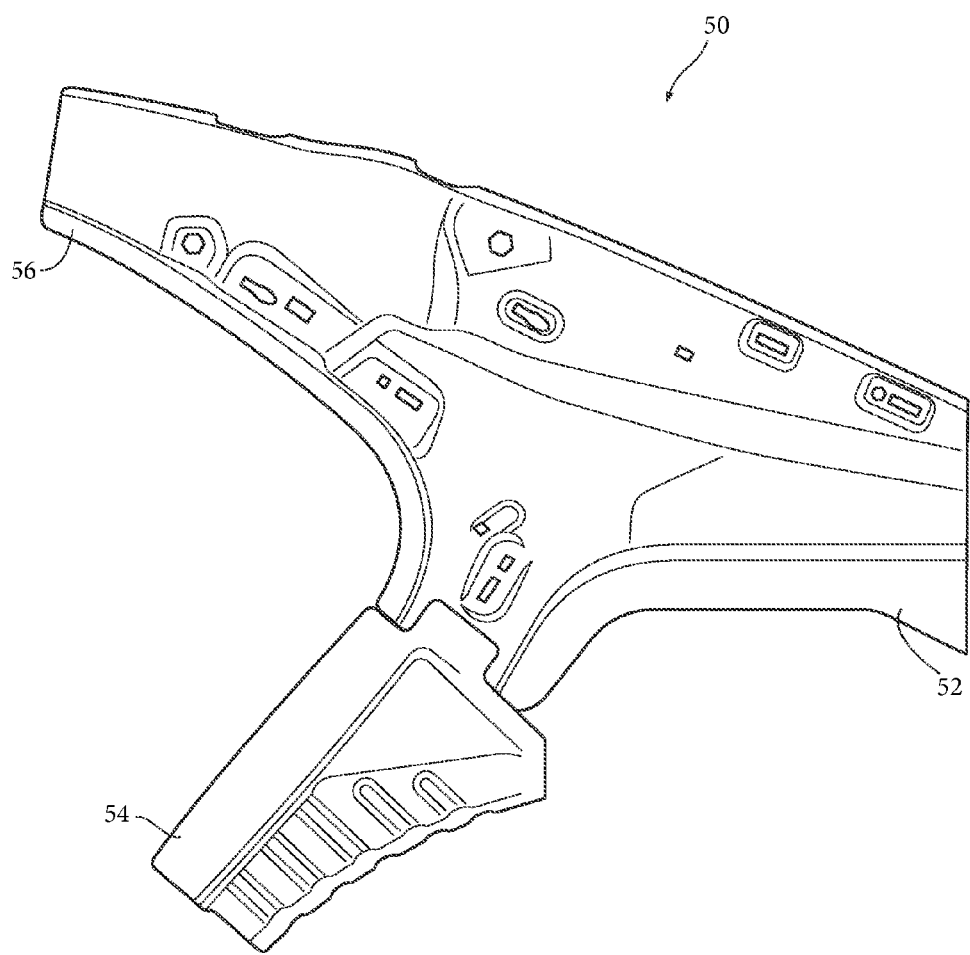
FIG. 2 is a perspective view of a portion of an exemplary vehicle upper body structural brace component.

Referring also to FIG. 2, the unibody structural assembly 12 further includes an upper body structural brace 50. The upper body structural brace 50 has a first, second and third members 52, 54, 56. The first member 52 has a first or outer end 58 in a rear region 60 of the vehicle 10. The rear region 60 is vertically between the rear bumper 32 and the roof rail 40 of the vehicle 10. The second and third members 54, 56 are each coupled to a second or inner end 62 of the first member 52. The second member 54 has an outer end 64 fixed to a bottom wheel housing component 65, and the third member 56 has an outer end 66 fixed to the roof rail 40. Accordingly, the upper body structural brace 50 mechanically couples the first end 58 of the first member 52 to both the roof rail 40 and the bottom frame component 34. In particular, with further reference to FIG. 3, the first, second and third members 52, 54, 56 transfer forces, such as impact force $F_A$ applied on the vehicle 10 at the rear region 60, from the first end 58 of the first member 52 to the bottom frame component 34 and the roof rail 40.

In a rear portion 70 of the rear passenger cabin 14 of the vehicle 10, a door aperture 72 is defined by the unibody structural assembly 12. In a forward portion 80 of the quarter panel region 16 of the vehicle 10, the unibody structural assembly 12 supports a fuel filler assembly 82 for the vehicle 10. According to the principles of the present disclosure, the upper body structural brace 50 may inhibit impact forces from excessively straining, deforming, or otherwise impinging upon the door aperture 72 and the fuel filler assembly 82. That is, when the first, second and third members 52, 54, 56 transfer forces, such as from impact force $F_A$, to the bottom frame component 34 and the roof rail 40, such forces are transferred around particular interior regions or portions of the vehicle 10, such as the rear portion 70 of the rear passenger cabin 14 and the forward portion 80 of the quarter panel region 16, so that the configuration of components extending therein, such as the door aperture 72 and the fuel filler assembly 82, may be maintained within acceptable levels of, e.g., deformation and strain. For example, in certain applications, and under certain conditions of the vehicle 10 requiring energy absorption, e.g. an impact with another vehicle at the rear of the vehicle 10, a target for deformation of the door aperture 72 is within 1 inch. In another example, in certain applications, and under certain conditions of the vehicle 10 requiring energy absorption, e.g. an impact with another vehicle at the rear of the vehicle 10, targets may be that the fuel filler assembly 82 is not deformed at all, and is under no greater than 10% strain.

Figure 4:
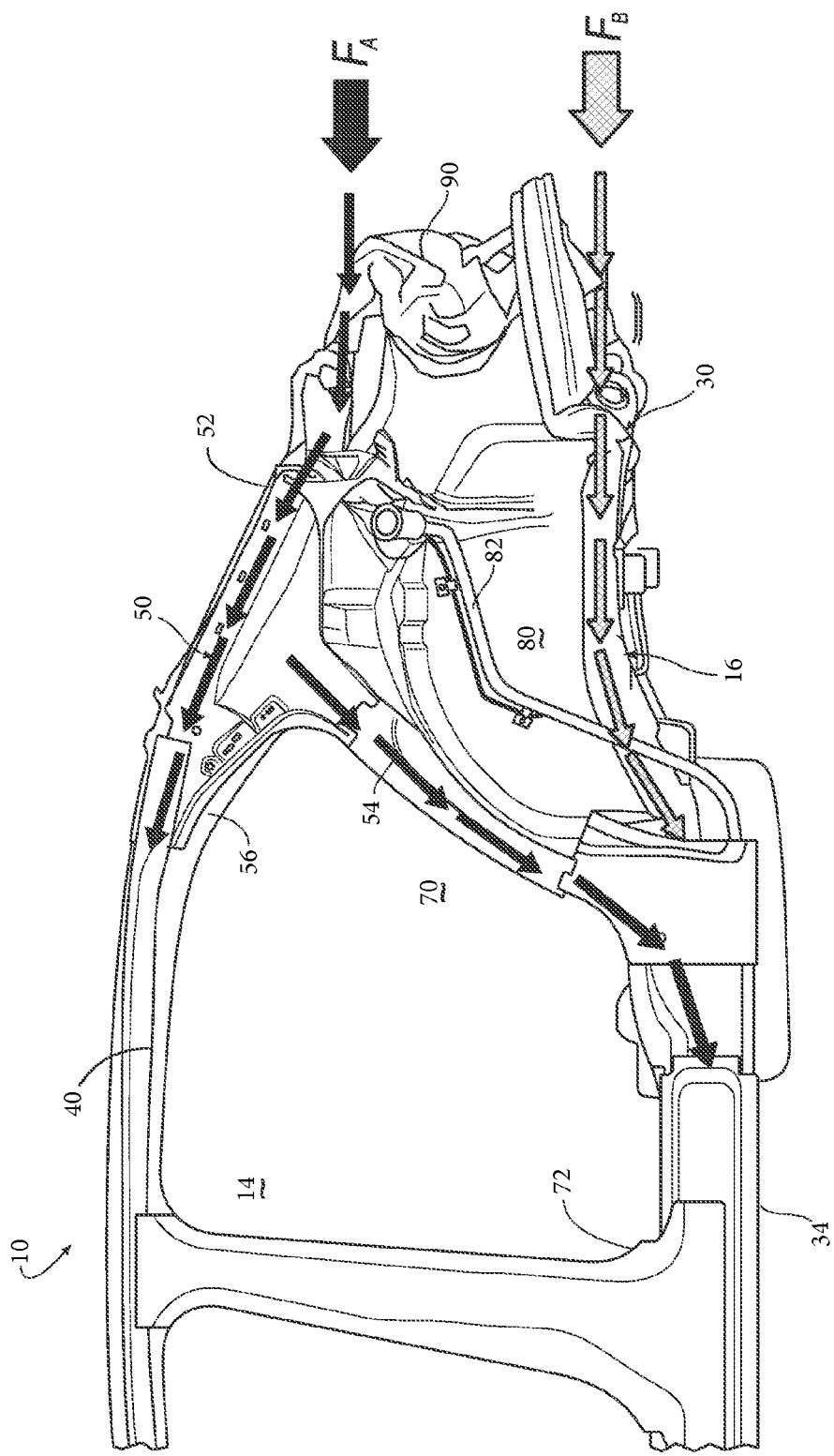
FIG. 4 is a side view of the exemplary unibody vehicle structure portion of FIG. 2 having been partially deformed under the schematically illustrated rear impact forces.

According to the principles of the present disclosure, in a rear impact on the vehicle 10 in which impact forces $F_A$ and $F_B$ are applied, the unibody structural assembly 12, including the upper body structural brace 50, operates to transfer substantially 60% of the impact forces $F_A$ and $F_B$ to the bottom frame component 34. Referring to FIG. 4, the remainder of the energy is transferred to the roof rails, e.g. roof rail 40, or absorbed through deformation, such as in a deformed region 90 of the vehicle 10, while the configuration of the door aperture 72 and the fuel filler assembly 82 are maintained with acceptable deformation and/or strain thresholds. It should be understood that, based on the particular design and configuration of a vehicle, the interior regions or components around which such impact forces are directed by an upper body structural brace according to the principles of the present disclosure may vary.

Figure 3:
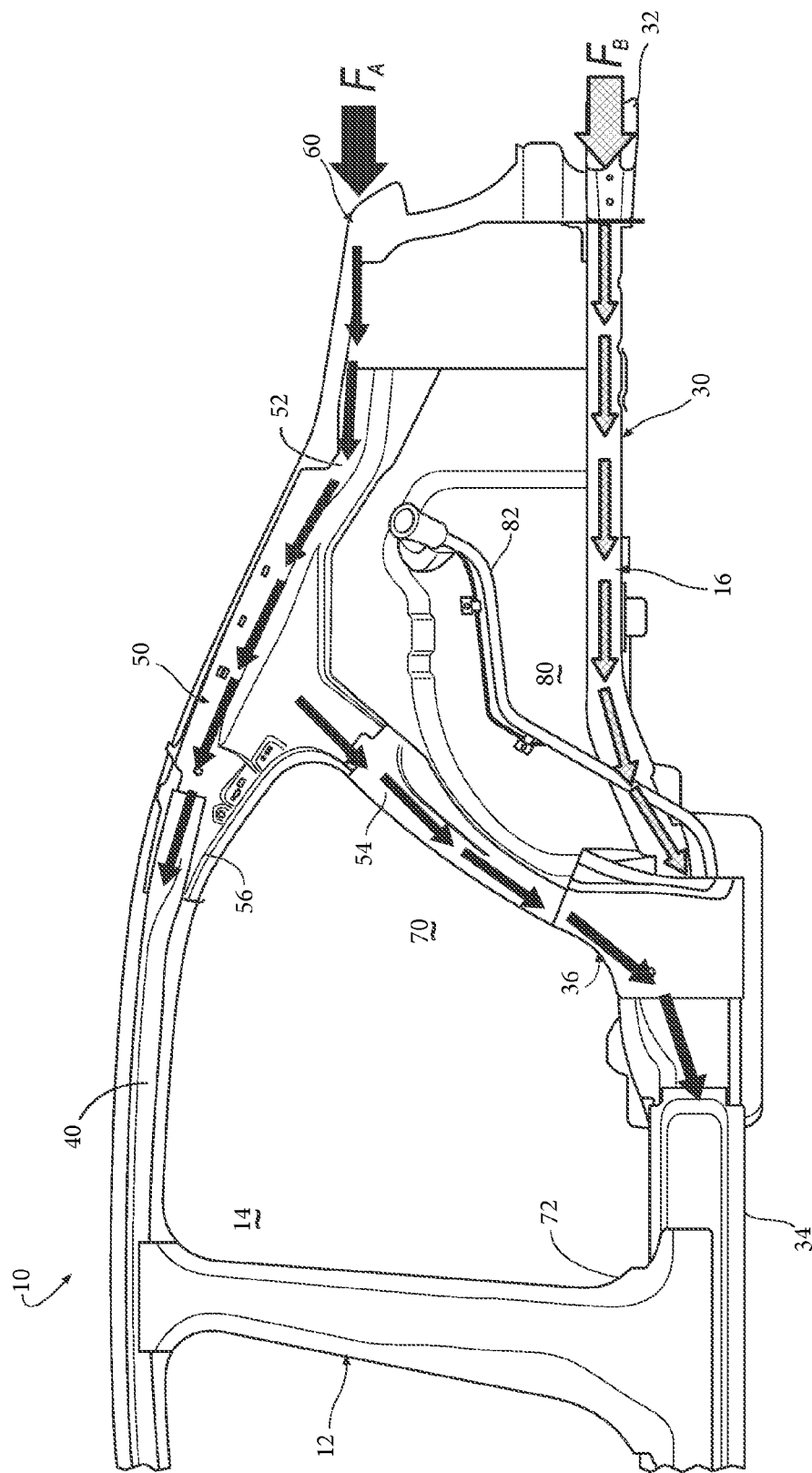
FIG. 3 is a side view of the exemplary unibody vehicle structure portion of FIG. 1 and exemplary schematically illustrated load paths of rear impact forces.

It should be understood that the unibody structural assembly 12 of the vehicle 10 may include further components in a substantially mirrored configuration on the opposing lateral side thereof (not shown). That is, while a first side of the vehicle 10 is illustrated in FIGS. 1, 3 and 4, on a second side of the vehicle may be another roof rail, another bottom frame component, and another upper body structural brace component. Accordingly, it should be understood that the description of the components of the first side of the vehicle 10 equally applies to components of a second side thereof. For example, like the upper body structural brace 50 described herein, such a second upper body structural brace may transfer forces, such as impact force $F_A$ at a first end of a first member thereof, from that first end, around interior regions of the vehicle 10, such as the rear portion 70 of the rear passenger cabin 14 and the forward portion 80 of the quarter panel region 16, and to the bottom frame component 34 and the additional roof rail. As such, repetitive disclosure relative to such components is not included herein.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It should be understood that, as used herein, exemplary refers to serving as an illustration or specimen, illustrative, or typical. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An assembly comprising:
   a brace component including a first member having a first end in an upper portion of a rear region of a vehicle, and second and third members each coupled to a second end of the first member,
   a lower vehicle unibody structural component being under a passenger region of the vehicle, and
   an upper vehicle unibody structural component being over the passenger region,
   wherein the second and third members are coupled to the lower and upper vehicle unibody structural components, respectively, and
   wherein the brace component and the lower and upper vehicle unibody structural components define an upper rear impact force transfer path configured to direct rear impact forces around the passenger region and a fuel filler region of the vehicle.

2. The assembly of claim 1, wherein the fuel filler region is a front portion of a rear quarter panel assembly of the vehicle.

3. The assembly of claim 2, wherein a fuel filler assembly for the vehicle is supported within the front portion of the rear quarter assembly of the vehicle.

4. The assembly of claim 1, wherein the passenger region is a rear portion of a rear passenger cabin of the vehicle.

5. The assembly of claim 4, wherein a passenger door aperture is defined between the apparatus and the lower and upper vehicle unibody structural components.

6. The assembly of claim 1, wherein the lower vehicle frame component is a portion of an underbody subassembly of the vehicle, and the upper vehicle unibody structural component is a roof rail of the vehicle.

7. The assembly of claim 6, wherein the underbody subassembly includes a rear bumper, a rear wheel housing component, and a bottom frame component, and the lower vehicle frame component is the bottom frame component.

8. The assembly of claim 1, wherein the first and third members are integrally formed.

9. The assembly of claim 8, wherein the first, second and third members are integrally formed.

10. The assembly of claim 8, wherein the first, second and third members are formed from steel.

11. An assembly comprising:
    a roof rail above a passenger region of a vehicle;
    an underbody subassembly including a rear bumper, a rear wheel housing component, and a bottom frame component, the bottom frame component being under the passenger region; and
    an upper body structural brace including a first member having a first end in a rear region of the vehicle above the rear bumper, the upper body structural brace further including second and third members each coupled to a second end of the first member, the second and third members coupling the bottom frame component and the roof rail, respectively, the rear region of the vehicle including a fuel filler region between the underbody subassembly and the upper body structural brace,
    wherein the assembly is configured to direct rear impact forces around the passenger and fuel filler regions through lower and upper rear impact force transfer paths, the lower rear impact force transfer path extending between the rear bumper and the bottom frame component, the upper rear impact force transfer path extending from the first end of the first member through the upper body structural brace to each of the bottom frame component and the roof rail.

12. The assembly of claim 11, wherein the fuel filler region is a front portion of a rear quarter panel assembly of the vehicle.

13. The assembly of claim 12, wherein a fuel filler assembly for the vehicle is supported within the fuel filler region.

14. The assembly of claim 11, wherein a door aperture for the passenger region is defined between the roof rail, the upper body structural brace, the rear wheel housing component, and the bottom frame component.

15. The assembly of claim 14, wherein the vehicle the rear wheel housing component is coupled in series between the bottom frame component and the second member of the upper body structural brace.

16. The assembly of claim 15, wherein the the second member of the upper body structural brace directly engages the rear wheel housing component.

17. The assembly of claim 11, wherein the first and third members are integrally formed.

18. The assembly of claim 17, wherein the first, second and third members are integrally formed.

19. An assembly comprising:
    a first roof rail above a passenger region on a first side of a vehicle;
    an underbody subassembly including a first bottom frame component under the passenger region on the first side of the vehicle;
    a first upper body structural brace having a first member with a first end in a rear region of the vehicle on the first side of the vehicle, the first upper body structural brace further having second and third members each coupled to a second end of the first member, the second and third members coupling the first bottom frame component and the first roof rail, respectively, the rear region of the vehicle including a fuel filler region on the first side of the vehicle between the underbody subassembly and the first upper body structural brace,
    wherein the assembly is configured to direct rear impact forces around the passenger and fuel filler regions through lower and upper first side rear impact force transfer paths, the lower first side rear impact force transfer path extending between the rear bumper and the first bottom frame component, the upper first side rear impact force transfer path extending from the first end of the first member through the first upper body structural brace to each of the first bottom frame component and the first roof rail.

20. The assembly of claim 19, further comprising:
    a second roof rail above the passenger region on a second side of the vehicle;
    a second bottom frame component under the passenger region on the second side of the vehicle;

a second upper body structural brace having a first member with a first end in the rear region of the vehicle on the second side of the vehicle, the second upper body structural brace further having second and third members each coupled to a second end of the first member, the second and third members coupling the second bottom frame component and the second roof rail, respectively, wherein the assembly is configured to direct rear impact forces through lower and upper second side rear impact force transfer paths, the lower second side rear impact force transfer path extending between the rear bumper and the second bottom frame component, the upper second side rear impact force transfer path extending from the first end of the first member through the upper body structural brace to each of the second bottom frame component and the second roof rail.

\* \* \* \* \*

UNITED STATES PATENT AND TRADEMARK OFFICE
CERTIFICATE OF CORRECTION

| | | |
|---|---|---|
| PATENT NO. | : 9,296,431 B1 | Page 1 of 1 |
| APPLICATION NO. | : 14/575033 | |
| DATED | : March 29, 2016 | |
| INVENTOR(S) | : Peyman Aghssa et al. | |

It is certified that error appears in the above-identified patent and that said Letters Patent is hereby corrected as shown below:

Claims

Column 4, line 30, Claim 16, line 1    Delete "the" (second occurrence).

Signed and Sealed this
Seventh Day of June, 2016

Michelle K. Lee
*Director of the United States Patent and Trademark Office*